United States Patent
Hailu et al.

(10) Patent No.: US 6,878,460 B1
(45) Date of Patent: Apr. 12, 2005

(54) THIN-FILM MAGNETIC RECORDING MEDIA WITH DUAL INTERMEDIATE LAYER STRUCTURE FOR INCREASED COERCIVITY

(75) Inventors: Abebe Hailu, San Jose, CA (US); Charles Changqing Chen, Milpitas, CA (US); Taesun Ernest Kim, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/396,365

(22) Filed: Mar. 26, 2003

Related U.S. Application Data

(60) Provisional application No. 60/424,960, filed on Nov. 7, 2002.

(51) Int. Cl.$^7$ ................................................. G11B 5/64
(52) U.S. Cl. ................. 428/611; 428/686; 428/694 TS; 428/694 TM
(58) Field of Search ................................. 428/611, 686, 428/694 TS, 694 TM

(56) References Cited

U.S. PATENT DOCUMENTS

| | | | |
|---|---|---|---|
| 5,851,643 A | * | 12/1998 | Honda et al. ............... 428/212 |
| 6,117,569 A | | 9/2000 | Lin et al. |
| 6,122,150 A | | 9/2000 | Gill |
| 6,127,053 A | | 10/2000 | Lin et al. |
| 6,175,477 B1 | | 1/2001 | Lin et al. |
| 6,178,074 B1 | | 1/2001 | Gill |
| 6,280,813 B1 | | 8/2001 | Carey et al. |
| 6,372,330 B1 | | 4/2002 | Do et al. |
| 6,381,105 B1 | | 4/2002 | Huai et al. |
| 6,383,668 B1 | | 5/2002 | Fullerton et al. |
| 6,391,430 B1 | | 5/2002 | Fullerton et al. |
| 2002/0039668 A1 | * | 4/2002 | Inomata et al. ....... 428/694 TM |

OTHER PUBLICATIONS

Margulies, D., Schabes, M., McChesney, W., and E. Fullerton (App. Phys. Let., 80(1), 2002, 91–93).*

Acharya, B., Ajan, A., Abarra, E., Inomata, A., and Okamoto, I. (App. Phys. Let., 80(1), 2002, 85–87).*

* cited by examiner

*Primary Examiner*—Kevin M. Bernatz
(74) *Attorney, Agent, or Firm*—McDermott Will & Emery LLP

(57) ABSTRACT

A thin film magnetic according medium with enhanced coercivity is provided. The magnetic recording medium comprises a non-magnetic substrate having a surface and a layer stack atop the substrate surface. The layer stack comprises a magnetic recording layer and a dual intermediate layer structure below the magnetic recording layer comprising a base layer and a non-magnetic layer between the base layer and the magnetic recording layer. The non-magnetic layer has a thickness less than that necessary for RKKY coupling between the base layer and the magnetic recording layer, and provides the medium with increased coercivity.

22 Claims, 3 Drawing Sheets

THIN-FILM MAGNETIC RECORDING MEDIA WITH DUAL INTERMEDIATE LAYER STRUCTURE FOR INCREASED COERCIVITY

CROSS-REFERENCE TO PROVISIONAL APPLICATION

This application claims priority from U.S. provisional patent application Ser. No. 60/424,960 filed Nov. 7, 2002, the entire disclosure of which is incorporated herein by reference.

FIELD OF THE INVENTION

The present invention relates to an improved magnetic recording medium, such as a thin film magnetic recording disk, and to a method of manufacturing the medium. The invention has particular applicability to longitudinal magnetic recording media exhibiting high areal recording density, low noise, high SMNR, and high coercivity.

BACKGROUND OF THE INVENTION

The continuously increasing requirements for thin film magnetic recording media with very high areal recording densities impose increasingly greater requirements on the magnetic properties of the various thin film layers constituting the media, such as increased remanent magnetic coercivity ($H_{cr}$), and coercivity squareness ($S_r^*$), low medium noise, e.g., expressed as signal-to-medium noise ratio (SMNR), and improved narrow track recording performance. As the areal recording density requirement increases, it becomes increasingly difficult to fabricate magnetic recording media, e.g., thin film longitudinal media, which satisfy each of these demanding requirements.

The ever-increasing demands for magnetic recording media with higher storage capacity, lower noise, and reduced cost have precipitated research with the aim of reducing the size of the magnetic grains necessary to record bits of information, while maintaining the integrity of the information as the grain size is progressively reduced. The area or space necessary to record information in magnetic recording media depends upon the size of the transitions between oppositely magnetized areas or domains. It is, therefore, desirable to form magnetic media which support the smallest possible transition size. However, the signal output from media with very small transition sizes must avoid excessive noise to reliably maintain the integrity of the stored information. Media noise is generally characterized as the sharpness of a signal on read-back, against the sharpness of a signal on writing of the media and is generally expressed as the signal-to-medium noise ratio (SMNR).

The linear recording density can be increased by increasing the H, of the media, however, this objective can only be achieved by decreasing the media noise, as by formation and maintenance of magnetic recording layers with very finely dimensioned, non-magnetically coupled grains. Media noise is a dominant factor restricting obtainment of further increases in areal recording density of high density magnetic hard disk drives. The problem, or cause, of media noise is generally attributed, in large part, to inhomogeneous magnetic grain size and inter-granular exchange coupling. Accordingly, it is considered that, in order to increase linear recording density of thin film magnetic media, the media noise must be minimized by suitable control of the microstructure of the magnetic recording layer(s).

A portion of a conventional thin film, longitudinal magnetic recording medium 1, such as is commonly employed in hard disk form in computer-related applications, is depicted in FIG. 1 in simplified, schematic cross-sectional view, and comprises a substantially rigid, non-magnetic substrate 10, typically of aluminum (Al) or an aluminum-based alloy, such as an aluminum-magnesium (Al—Mg) alloy, or of glass, glass-ceramic, etc., having sequentially deposited or otherwise formed on a surface 10A thereof a plurality of thin film layers. When substrate 10 comprises Al or an Al-based alloy a plating layer 11, such as of amorphous nickel-phosphorus (Ni—P), is typically initially provided on substrate surface 10A (such NiP plating layer 11 generally is omitted when substrate 10 comprises glass). The plurality of thin film layers formed over plating layer 11 or substrate surface 10A include a system 12 of layers for control of the microstructure of medium 1, comprising a first, or seed layer 12A of an amorphous or fine-grained material, e.g., a chromium-titanium (Cr—Ti) alloy and a second, polycrystalline underlayer 12B, typically of Cr, a Cr-based alloy, or other BCC-structured alloy; an intermediate (or "onset") layer 13 of a magnetic alloy, such as a Co-based alloy, e.g., CoCrTa, CoCrPtNi, CoCrTaPt, CoCrPtB, and CoCrTaBPt, for providing further improvement of the microstructure, texture, and crystallographic orientation of overlying magnetic recording layer(s); at least one magnetic recording layer 14, e.g., of a cobalt (Co)-based alloy with one or more of platinum (Pt), Cr, boron (B), etc.; a protective overcoat layer 15, typically containing carbon (C), e.g., diamond-like carbon ("DLC"); and a lubricant topcoat layer 16, e.g., of a perfluoropolyether. Each of layers 11–15 may be deposited by suitable physical vapor deposition ("PVD") techniques, such as sputtering, and layer 16 is typically deposited by dipping or spraying.

In operation of medium 1, the at least one magnetic layer 14 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the at least one recording layer 14 can subsequently produce an electrical response in a read transducer, or read "head", allowing the stored information to be read.

As indicated above, it is recognized that the magnetic properties which are critical to the performance of the at least one magnetic recording layer 14, i.e., coercivity $H_{cr}$, magnetic remanence-thickness product $M_r t$, coercivity squareness S*, signal-to-media noise ratio SMNR, and thermal stability characteristics, depend primarily on the microstructure of the at least one magnetic recording layer 14 which, in turn, is strongly influenced by the microstructure of the underlying system 12 of seed and underlayers 12A and 12B, respectively. It is also recognized that underlayers having a very fine grain structure are highly desirable, particularly for growing fine grains of hexagonal close-packed (hcp) Co-based magnetic alloys deposited thereon.

Notwithstanding improvements made in recent years in the performance of high areal density longitudinal thin-film magnetic recording media, e.g., as by interposition of intermediate magnetic layer 13 between the at least one magnetic recording layer 14 and underlayer 12B, as described supra, further improvement in the performance of high areal density thin film longitudinal recording media is desired.

Accordingly, there exists a need for improved high areal density, thin film longitudinal magnetic recording media exhibiting enhanced bulk magnetic properties, e.g., thermal stability, increased coercivity $H_{cr}$, and increased squareness $S^*$, without adverse effects on the magnetic remanence-thickness product $M_r t$.

The present invention, therefore, addresses and solves problems-attendant upon the manufacture of thermally stable, high areal density thin film longitudinal magnetic recording media, while affording full compatibility with all technical and economic aspects of conventional automated manufacturing technology for fabrication of thin film magnetic recording media.

DISCLOSURE OF THE INVENTION

An advantage of the present invention is an improved thin film magnetic recording medium with enhanced coercivity.

Another advantage of the present invention is a method of manufacturing an improved thin film magnetic recording medium with enhanced coercivity.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a thin film magnetic recording medium with enhanced coercivity, comprising:

a non-magnetic substrate having a surface;
a layer stack atop the substrate surface, the layer stack comprising
  a magnetic recording layer; and
  an intermediate layer below the magnetic recording layer, the intermediate layer being a dual-layer structure comprising:
    (i) a base layer; and
    (ii) a non-magnetic layer between the base layer and the magnetic recording layer, the non-magnetic layer having a thickness less than that necessary for RKKY coupling between the base layer and the magnetic recording layer, and providing the medium with increased coercivity.

According to preferred embodiments of the present invention, the non-magnetic layer comprises Ru or an alloy thereof, and is up to about 3 Å thick; the base layer comprises a Co-based alloy selected from the group consisting of CoCrTa, CoCrPtNi, CoCrTaPt, CoCrPtB, and CoCrTaBPt, and is from about 5 to about 50 Å thick; the magnetic recording layer comprises at least one layer of at least one Co-based alloy selected from the group consisting of CoCrPtB, CoCrPt, CoCrTa, CoCrPtTa, and CoCrPtTaNb.

In accordance with further embodiments of the present invention, the medium further comprises a non-magnetic seed layer/underlayer pair intermediate the substrate surface and the layer stack for controlling the crystallographic texture of Co-based magnetic alloys, the seed layer preferably comprised of an amorphous or fine-grained non-magnetic material selected from the group consisting of Ni—Al, Fe—Al, Cr—Ti, Cr—Ta, Ta, Ta—W, Ru—Al, and Ta—N and the underlayer preferably comprised of Cr or a non-magnetic Cr-based alloy; the non-magnetic substrate is selected from the group consisting of Al, Al—Mg alloys, other Al-based alloys, NiP-plated Al, NiP-plated Al-based alloys, glass, ceramics, polymers, and laminates or composites thereof; and the medium further comprises a protective overcoat layer and a lubricant topcoat layer atop the layer stack.

Another aspect of the present invention is a method of manufacturing a thin film magnetic recording medium with enhanced coercivity, comprising steps of:

(a) providing a non-magnetic substrate having a surface;
(b) forming a layer stack atop the substrate surface, the layer stack comprising:
  a magnetic recording layer; and
  an intermediate layer below the magnetic recording layer, the intermediate layer being a dual-layer structure comprising:
    (i) a base layer; and
    (ii) a non-magnetic layer between the base layer and the magnetic recording layer, the non-magnetic layer having a thickness less than that necessary for RKKY coupling between the base layer and the magnetic recording layer, and providing the medium with increased coercivity.

According to preferred embodiments of the present invention, step (b) comprises forming the non-magnetic layer as comprising Ru or an alloy thereof and in a thickness up to about 3 Å; forming the base layer as comprising a Co-based alloy selected from the group consisting of CoCrTa, CoCrPtNi, CoCrTaPt, CoCrPtB, and CoCrTaBPt, and in a thickness from about 5 to about 50 Å; and forming the magnetic layer as comprising at least one layer of at least one Co-based alloy selected from the group consisting of CoCrPtB, CoCrPt, CoCrTa, CoCrPtTa, and CoCrPtTaNb.

In accordance with further embodiments of the present invention, step (b) further comprises forming a non-magnetic seed layer/underlayer pair intermediate the substrate surface and the base layer for controlling the crystallographic texture of Co-based magnetic alloys, the seed layer comprised of an amorphous or fine-grained non-magnetic material selected from the group consisting of Ni—Al, Fe—Al, Cr—Ti, Cr—Ta, Ta, Ta—W, Ru—Al, and Ta—N and the underlayer comprised of Cr or a non-magnetic Cr-based alloy; and step (a) comprises providing a non-magnetic substrate selected from the group consisting of Al, Al-mg alloys, other Al-based alloys, NiP-plated Al, NiP-plated Al-based alloys, glass, ceramics, polymers, and laminates or composites thereof.

According to embodiments of the present invention, the method further comprises steps of:

(c) forming a protective overcoat layer atop the layer stack; and
(d) forming a lubricant topcoat layer on the protective overcoat layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon the discovery that improved high areal recording density, thin film magnetic recording media, e.g., longitudinal media, exhibiting enhanced magnetic recording properties, including, inter alia, increased coercivity $H_{cr}$ and coercivity squareness S*, with no sacrifice in magnetic remanence-thickness product $M_{rt}$, can be easily and readily fabricated by including a novel dual-layer intermediate layer structure beneath the magnetic recording layer of the medium.

A key feature of the present invention, therefore, is the discovery that placement of a second intermediate layer in the form of a very thin non-magnetic layer, e.g., of Ru or a Ru-based alloy up to about 3 Å thick, between a first, or base intermediate layer, e.g., of a Co-based alloy, and the magnetic recording layer, results in enhancement of the coercivity $H_{cr}$ and coercivity squareness S* of the medium, with no sacrifice in magnetic remanence-thickness product $M_{rt}$. According to the invention, the very thin non-magnetic layer is of a thickness less than that necessary for effecting RKKY coupling between the base intermediate layer and the at least one magnetic recording layer, but of sufficient thickness as to increase the coercivity and squareness of the media, relative to when it is not present as part of the intermediate layer, with no sacrifice in magnetic remanence-thickness product.

Figure 2:
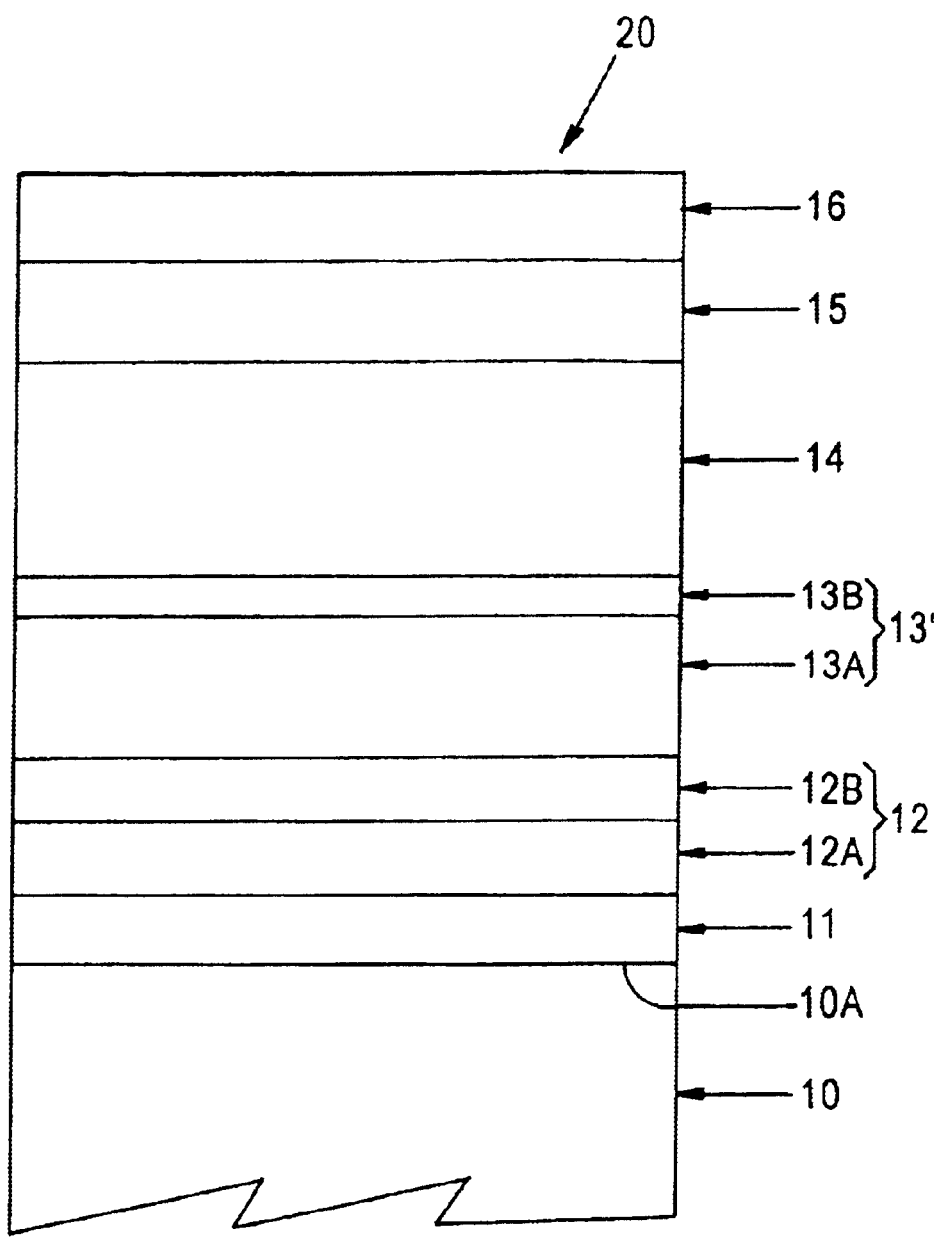
FIG. 2 schematically illustrates, in simplified, cross-sectional view, a portion of a longitudinal magnetic recording medium according to the present invention.

Referring to FIG. 2, schematically illustrated therein, in simplified, cross-sectional view, is a portion of an embodiment of a longitudinal magnetic recording medium 20 comprising the novel dual-layer intermediate layer structure according to the present invention. As illustrated, medium 20 includes a non-magnetic substrate 10 selected from among non-magnetic metals and alloys, Al, Al-based alloys such as Al—Mg alloys, NiP-plated Al ("Al/NiP"), glass, ceramics, polymers, and composites and laminates of the aforementioned materials. The thickness of substrate 10 is not critical; however, in the case of magnetic recording media for use in hard disk applications, substrate 10 must be of a thickness sufficient to provide the necessary rigidity.

When medium 20 is in the form of a hard disk, substrate 10 typically comprises Al or an Al-based alloy, e.g., an Al—Mg alloy, and includes on the surface thereof a plating layer 11, e.g., a layer of amorphous NiP. Formed on the plating layer is an underlayer structure 12 comprising an optional seed layer 12A and a polycrystalline underlayer 12B for controlling and promoting a desired crystallographic texture (e.g., BCC) and magnetic properties of ferromagnetic Co-based alloy layers deposited thereover. Seed layer 12A, when present, is typically comprised of an amorphous or fine-grained material, e.g., a Ni—Al, Fe—Al, Cr—Ti, Cr—Ta, Ta, Ta—W, Ru—Al, or TaN layer from about 10 to about 500 Å thick, preferably about 245 Å thick. The overlying non-magnetic, polycrystalline underlayer 12B for promoting BCC crystal orientation is typically a Cr or Cr-based alloy layer (e.g., of Cr—W, Cr—Mo, CoCr, etc.), or a $Cr/Cr_{100-x}M$, bi-layer structure, where M is a metal selected from among W and V and x<15, e.g., $Cr/Cr_{90}W_{10}$, and generally has a thickness from about 30 to about 150 Å, preferably about 125 Å.

According to the invention, medium 20 includes, as part of its layer stack, a novel dual-layer intermediate layer structure 13' atop underlayer structure 12, which dual-layer structure 13' is comprised of a first, "base" or "onset" intermediate layer 13A in contact with underlayer 12B, and an overlying second, very thin non-magnetic layer 13B. The first, or "base" intermediate layer 13A is similar to intermediate layer 13 of conventional medium 1 shown in FIG. 1 and is typically comprised of an about 5 to about 50 Å thick layer, preferably about 45 Å thick, of a Co-based alloy, e.g., CoCrTa, CoCrPtNi, CoCrTaPt CoCrPtB, or CoCrTaBPt.

Figure 1:
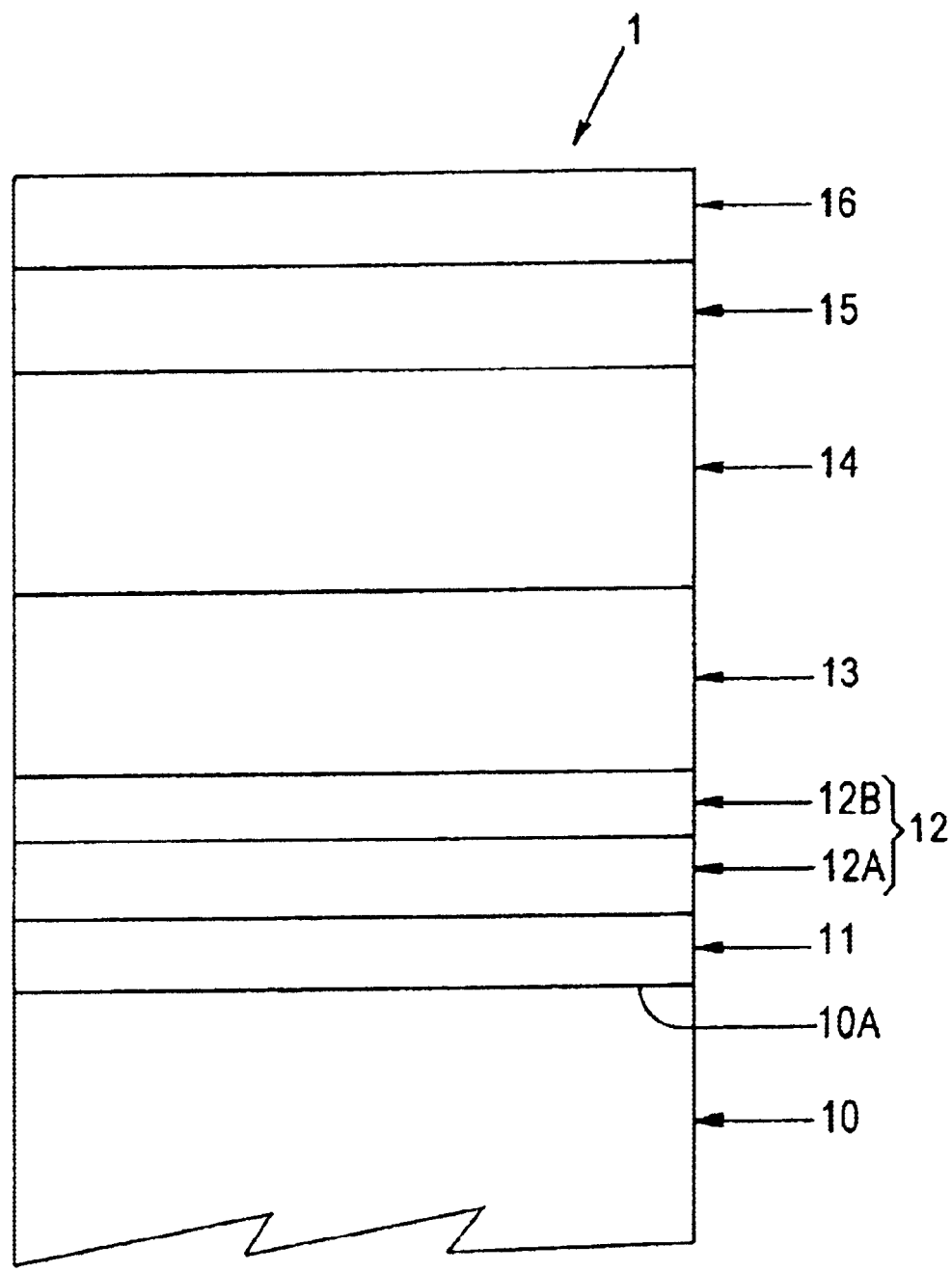
FIG. 1 schematically illustrates, in simplified, cross-sectional view, a portion of a conventional longitudinal magnetic recording medium.

The combination of the second, very thin non-magnetic layer 13B and the "base" intermediate layer 13A of the inventive dual-layer intermediate layer structure 13' serves to reduce lattice mismatch and promote epitaxial growth leading to increased coercivity and coercivity squareness of the overlying magnetic recording layer(s) 14, relative to the single intermediate layer 13 of the conventional media (such as shown in FIG. 1), without compromising the magnetic remanence-thickness product of media 20. According to the invention, the thickness of second, very thin non-magnetic layer 12B is substantially less than that of the 8–10 Å thick non-magnetic spacer layers required for providing RKKY-type coupling of vertically spaced apart magnetic layers in anti-ferromagnetically coupled ("AFC") media. Thus, according to the invention, the thickness of the second, very thin non-magnetic layer 13B of the dual-layer intermediate layer structure 13' is, in contrast with AFC media, not greater than about 3 Å. Suitable non-magnetic materials for use as the second, very thin intermediate layer 13B include Ru and Ru-based alloys.

Overlying and in contact with the second, thin non-magnetic layer 13B of the dual-layer intermediate layer structure 13' is an about 150 to about 350 Å thick layer, preferably about 250 Å thick, of ferromagnetic recording layer 14, comprised of at least one layer of at least one Co-based alloy, e.g., CoCrPtB, CoCrPt. CoCrTa, CoCrPtTa, or CoCrPtTaNb.

Completing the layer stack constituting medium 20 is a protective overcoat layer 15 in overlying contact with ferromagnetic recording layer 14, which protective overcoat layer typically comprises carbon (C) in the form of a diamond-like carbon ("DLC"), and a thin lubricant topcoat layer 16, of e.g., a perfluoropolyether compound, in overlying contact with the protective overcoat layer.

Each of the layers of medium 20, except for the lubricant topcoat layer 16, may be deposited or otherwise formed by any suitable physical vapor deposition technique (PVD), e.g., sputtering, vacuum evaporation, etc., or by a combination of various PVD techniques. Lubricant topcoat layer 16 is typically provided over the upper surface of the protective overcoat layer in conventional fashion, e.g., as by dipping of the medium into a bath containing a solution of the lubricant compound, followed by removal of excess liquid, e.g., by wiping.

As indicated supra, the dual-layer intermediate layer structure 13' according to the invention comprising a combination of a first, or base intermediate layer 13A and an overlying second, very thin non-magnetic intermediate layer 13B (i.e., up to about 3 Å thick) serves to beneficially expand the crystal lattice of the second intermediate layer thereby to reduce lattice mismatch, improve epitaxial growth of the overlying magnetic recording layer(s), and increase the coercivity and squareness of the latter, relative to conventional media with a single intermediate layer.

EXAMPLES

A series of thin film magnetic media with layer stacks corresponding to the embodiment 20 of the invention schematically illustrated in FIG. 2 were prepared under substantially identical layer formation conditions, wherein the first, or "base" intermediate layer 13A of the dual-layer intermediate layer structure 13' was constituted of CoCrTa alloy in thicknesses ranging from about 5 to about 50 Å and the overlying second, very thin non-magnetic intermediate layer 13B was constituted of Ru in thicknesses ranging from 0 to about 4 Å. The dependencies of the coercivity $H_{cr}$, magnetic remanence-thickness product $M_r t$, and coercivity squareness $S^*$ on the thickness of the second, very thin non-magnetic intermediate layer 13B were determined. The results are tabulated below in Table I and graphically presented in FIGS. 3–5, wherein FIGS. 3–5 respectively illustrate the variation of the magnetic remanence-thickness product $M_r t$, the coercivity squareness $S^*$, and remanent coercivity $H_{cr}$ of longitudinal magnetic recording media as a function of the thickness of the thin Ru layer as the second, very thin non-magnetic layer of the dual-layer intermediate layer structure according to the present invention.

Figure 3:
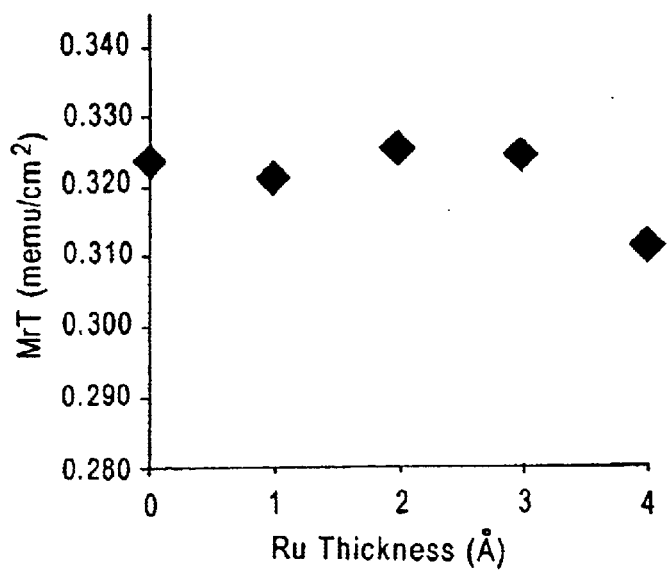
FIG. 3 is a graph for illustrating the variation of the magnetic remanence-thickness product $M_r t$ of longitudinal magnetic recording media as a function of thickness of a thin Ru layer as the non-magnetic layer of the dual-layer intermediate layer structure according to the present invention.
Figure 4:
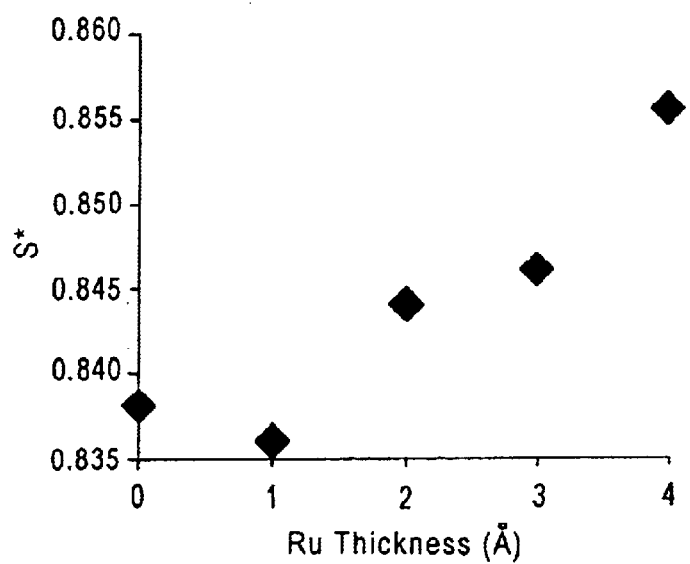
FIG. 4 is a graph for illustrating the variation of the coercivity squareness S* of longitudinal magnetic recording media as a function of thickness of a thin Ru layer as the non-magnetic layer of the dual-layer intermediate layer structure according to the present invention.
Figure 5:
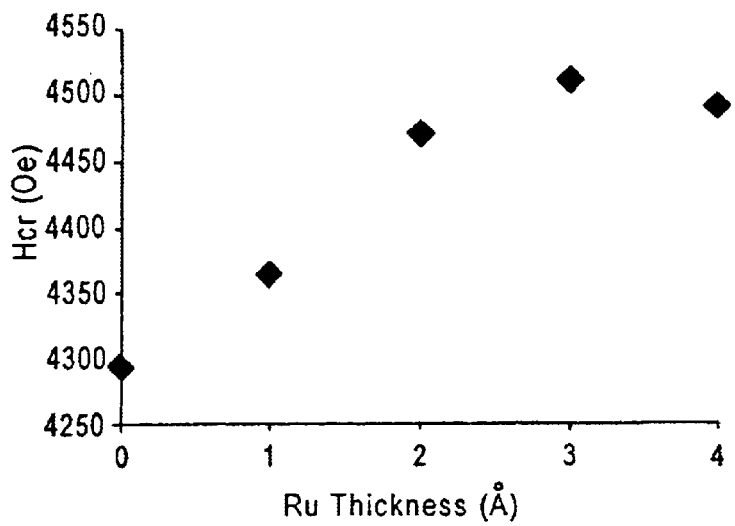
FIG. 5 is a graph for illustrating the variation of the remanent coercivity $H_{cr}$ of longitudinal magnetic recording media as a function of thickness of a thin Ru layer as the non-magnetic layer of the dual-layer intermediate layer structure according to the present invention.

As is apparent from FIGS. 3–5, the coercivity $H_{cr}$ and squareness $S^*$ increase linearly with Ru layer thickness up to about 3 Å while the magnetic remanence-thickness product $M_r t$ advantageously remains substantially constant. (The coercivity $H_{cr}$ appears to saturate at Ru layer thicknesses >~3 Å.

TABLE I

| Ru Thickness, Å | $H_{cr}$ | $M_r t$ | $S^*$ |
| --- | --- | --- | --- |
| 0 | 4293 | 0.324 | 0.838 |
| 1 | 4363 | 0.321 | 0.836 |
| 2 | 4470 | 0.325 | 0.844 |
| 3 | 4510 | 0.324 | 0.846 |
| 4 | 4491 | 0.311 | 0.856 |

The above-described results clearly demonstrate the advantageous effects on coercivity $H_{cr}$ and squareness S of thin film longitudinal magnetic recording media afforded by the novel dual-layer intermediate layer structure 13' according to the present invention, vis-à-vis conventional media with a single Co-based intermediate layer.

The present invention thus advantageously provides high quality, thermally stable, high areal recording density longitudinal magnetic recording media, which media achieve increased coercivity and squareness, without compromising the magnetic remanence-thickness product, via formation of the inventive dual-layer structure of the intermediate layer beneath the recording layer. Moreover, the inventive methodology can be practiced in a cost-effective manner, utilizing conventional manufacturing technology and equipment (e.g., sputtering technology and equipment) for automated, large-scale manufacture of magnetic recording media, such as hard disks. Finally, the invention is not limited to use with hard disks, but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein:

What is claimed is:

1. A thin film magnetic recording medium with enhanced coercivity, comprising:

a non-magnetic substrate having a surface;

a layer stack atop said substrate surface, said layer stack comprising
     a magnetic recording layer; and
     an intermediate layer below said magnetic recording layer, said intermediate layer being a dual-layer structure comprising:
       (i) a base layer; and
       (ii) a non-magnetic layer between said base layer and said magnetic recording layer, said non-magnetic layer having a thickness less than that necessary for RKKY coupling between said base layer and said magnetic recording layer, and providing said medium with increased coercivity, wherein said base layer is from about 5 to about 50 Å thick and said non-magnetic layer is up to 3 Å thick.

2. The medium as in claim 1, wherein:

said non-magnetic layer comprises Ru or an alloy thereof.

3. The medium as in claim 2, wherein:

said non-magnetic layer is up to about 3 Å thick.

4. The medium as in claim 1, wherein:

said base layer comprises a Co-based alloy.

5. The medium as in claim 4, wherein:

said base layer comprises a Co-based alloy selected from the group consisting of CoCrTa, CoCrPtNi, CoCrTaPt, CoCrPtB, and CoCrTaBPt.

6. The medium as in claim 1, wherein:

said magnetic recording layer comprises at least one layer of at least one Co-based alloy.

7. The medium as in claim 6, wherein:

said at least one Co-based alloy is selected from the group consisting of CoCrPtB, CoCrPt, CoCrTa, CoCrPtTa, and CoCrPtTaNb.

8. The medium as in claim 1, wherein:

said medium further comprises a non-magnetic seed layer/underlayer pair intermediate said substrate surface and said layer stack for controlling the crystallographic texture of Co-based magnetic alloys.

9. The medium as in claim 8, wherein:

said seed layer is comprised of an amorphous or fine-grained non-magnetic material selected from the group consisting of Ni—Al, Fe—Al, Cr—Ti, Cr—Ta, Ta, Ta—W, Ru—Al, and Ta—N and said underlayer is comprised of Cr or a non-magnetic Cr-based alloy.

10. The medium as in claim 1, wherein:

said non-magnetic substrate is selected from the group consisting of Al, Al—Mg alloys, other Al-based alloys; NiP-plated-Al; NiP-plated Al-based alloys, glass, ceramics, polymers, and laminates or composites thereof.

11. The medium as in claim 1, further comprising a protective overcoat layer and a lubricant topcoat layer atop said layer stack.

12. The medium as in claim 1, wherein:

said medium has a coercivity in the range from 4293 Oersteds to 4520 Oersteds.

13. A method of manufacturing a thin film magnetic recording medium with enhanced coercivity, comprising steps of:

(a) providing a non-magnetic substrate having a surface;

(b) forming a layer stack atop said substrate surface, said layer stack comprising:

a magnetic recording layer; and an intermediate layer below said magnetic recording layer, said intermediate layer being a dual-layer structure comprising:

(i) a base layer; and (ii) a non-magnetic layer between said base layer and said magnetic recording layer, said non-magnetic layer having a thickness less than that necessary for RKKY coupling between said base layer and said magnetic recording layer, and providing said medium with increased coercivity, wherein step (b) comprises forming said base layer in a thickness from about 5 to about 50 Å and said non-magnetic layer is up to 3 Å thick.

14. The method according to claim 13, wherein:

step (b) comprises forming said non-magnetic layer as comprising Ru or an alloy thereof.

15. The method according to claim 14, wherein:

step (b) comprises forming said non-magnetic layer in a thickness up to about 3 Å.

16. The method according to claim 13, wherein:

step (b) comprises forming said base layer as comprising a Co-based alloy selected from the group consisting of CoCrTa, CoCrPtNi, CoCrTaPt, CoCrPtB, and CoCrTaBPt.

17. The method according to claim 13, wherein:

step (b) comprises forming said magnetic layer as comprising at least one layer of at least one Co-based alloy selected from the group consisting of CoCrPtB, CoCrPt, CoCrTa, CoCrPtTa, and CoCrPtTaNb.

18. The method according to claim 13, wherein:

step (b) further comprises forming a non-magnetic seed layer/underlayer pair intermediate said substrate surface and said base layer for controlling the crystallographic texture of Co-based magnetic alloys.

19. The method according to claim 18, wherein:

step (b) comprises forming said seed layer as comprised of an amorphous or fine-grained non-magnetic material selected from the group consisting of Ni—Al, Fe—Al, Cr—Ti, Cr—Ta, Ta, Ta—W, Ru—Al, and Ta—N and forming said underlayer as comprised of Cr or a non-magnetic Cr-based alloy.

20. The method according to claim 13, wherein:

step (a) comprises providing a non-magnetic substrate selected from the group consisting of Al, Al—Mg alloys, other Al-based alloys, NiP-plated Al, NiP-plated Al-based alloys, glass, ceramics, polymers, and laminates or composites thereof.

21. The method according to claim 13, further comprising steps of:

(c) forming a protective overcoat layer atop said layer stack; and (d) forming a lubricant topcoat layer on said protective overcoat layer.

22. The method according to claim 13, wherein:

said medium has a coercivity in the range from 4293 Oersteds to 4520 Oersteds.

* * * * *